(12) United States Patent
Soni et al.

(10) Patent No.: US 6,994,257 B2
(45) Date of Patent: *Feb. 7, 2006

(54) METHOD AND APPARATUS FOR ENCODING AND DECODING INFORMATION IN A NON-VISIBLE MANNER

(75) Inventors: Vivek K. Soni, Lynnfield, MA (US); J. Barry Mahoney, Andover, MA (US); William T. Plummer, Concord, MA (US); Richard G. Egan, Dover, MA (US)

(73) Assignee: Polaroid Corporation, Waltham, MA (US)

( * ) Notice: Subject to any disclaimer, the term of this patent is extended or adjusted under 35 U.S.C. 154(b) by 397 days.

This patent is subject to a terminal disclaimer.

(21) Appl. No.: 10/445,594

(22) Filed: May 27, 2003

(65) Prior Publication Data

US 2003/0205621 A1 Nov. 6, 2003

Related U.S. Application Data

(62) Division of application No. 09/652,427, filed on Aug. 31, 2000, now Pat. No. 6,595,427.

(51) Int. Cl.
*G06K 7/10* (2006.01)
(52) U.S. Cl. .................................. 235/468
(58) Field of Classification Search .............................
235/462.01–462.49, 468, 491; 106/31.13–31.15
See application file for complete search history.

(56) References Cited

U.S. PATENT DOCUMENTS 3,599,153 A * 8/1971 Lewis et al. ............... 235/449

* cited by examiner

*Primary Examiner*—Michael G. Lee
*Assistant Examiner*—Jamara A. Franklin

(57) ABSTRACT

The present invention relates to encoding and decoding of information using materials that are capable of mildly absorbing radiation over a wide range of infrared wavelengths and substantially non-absorbing in the visible wavelengths. Examples of such encoding of information are bar codes and area markings. Information is encoded in markings on a base medium by depositing or intertexturing on the base medium a material where the surface dimensions, thickness and presence of the material contain the encoded information. The encoding, as disclosed in this invention, utilizes a lower cost, more stable material than a material that is capable of highly absorbing over a range of infrared wavelengths and substantially non-absorbing in the visible wavelengths. However, since the material used in this invention is mildly absorbing in the infrared range, the signal obtained by reflecting or transmitting infrared radiation from the markings will be less distinct. Thus, inventive methods are needed to ensure that the encoded information can be decoded. Two different approaches are disclosed; (a) detecting the absorption spectrum and comparing to the known spectrum of the material in order to detect the presence and surface dimensions of the material and (b) utilizing techniques to improve the signal-to-noise such as restricting the range of wavelengths, matched filters and narrowing the bandwidth.

40 Claims, 13 Drawing Sheets

METHOD AND APPARATUS FOR ENCODING AND DECODING INFORMATION IN A NON-VISIBLE MANNER

This is a divisional application of prior application Ser. No. 09/652,427, filed on Aug. 31, 2000 by Soni et al. and entitled METHOD AND APPARATUS FOR ENCODING AND DECODING INFORMATION IN A NON-VISIBLE MANNER, now U.S. Pat. No. 6,595,427.

FIELD OF THE INVENTION

The present invention relates to encoding and decoding of information using materials that are capable of absorbing radiation over a wide range of infrared wavelengths and substantially non-absorbing in the visible wavelengths. Examples of such encoding of information are bar codes and area markings. Specifically, in the present invention, the information is encoded by depositing a material having near infrared absorption but no visible absorption on a common substrate. Methods and apparatus for retrieving the information use means for increasing the signal-to-noise ratio of the signal containing the information related to the dimensions of the deposited material or use properties of the absorption spectrum to deduce the dimensions of the deposited material.

BACKGROUND OF THE INVENTION

Providing authenticity and security for photo identification and providing identifying information in consumer products are two of the most common applications of encoded markings such as bar codes. In many implementations, bar codes are black and white bars in which the information is encoded in the widths of the bars. The bar code is read with an optical reader comprised of a source that emits radiation in a range of wavelengths, means of scanning the radiation across the bar code and a detector that receives the reflected radiation. The information can be decoded from the electrical signal produced by the detector since the reflectance from the black bars is significantly different than that from the white bars.

While such an encoding method is commonly used, for a small object the bar code occupies a significant portion of the object and it detracts from the esthetics of the product. Also, a black and white bar code is susceptible to forgery once the code is deciphered or if the bar code adheres to a known standard.

In response to the first of these shortcomings, bar codes that are essentially non-visible and which can be read with infrared radiation have been developed. To implement the non-visible bar codes, the material deposited on the object or receiving medium must be invisible under radiation in the visible range but detectable under infrared radiation. Proposed materials included organic dyes such as cyanine based dyes and naphthoquinone dyes (U.S. Pat. No. 5,911,921) and inorganic materials such as Ytterbium phosphate (U.S. Pat. No. 5,911,921). The organic dyes are not stable in harsh environments and have some selective absorption in the visible range. The inorganic materials can be expensive to manufacture although the Ytterbium phosphate powder disclosed and claimed in U.S. Pat. No. 5,911,921 could represent a lower cost solution.

However, any bar code implemented with a material having high absorption in near infrared does not pose a solution to the problem of preventing forgeries since the use of an infrared scope or viewer will make the bar code detectable and the bar code could be counterfeited using infrared absorbers.

One solution, disclosed in U.S. Pat. No. 5,760,384, is to use a material that absorbs infrared radiation within a narrow band of wavelengths. One embodiment disclosed in U.S. Pat. No. 5,760,384 is a phthalocyanine which could exhibit instability in harsh environments.

An alternate approach to solving the problem of preventing forgeries is to detect the forgeries. U.S. Pat. No. 5,760,384 also discloses an apparatus and method for judging whether a bar code, comprising a material that absorbs infrared radiation within a narrow band of wavelengths, is real or a forgery. The disclosed method comprises detecting the reflectance at the peak absorption wavelength and at another neighboring wavelength away from the peak absorption wavelength.

U.S. Pat. No. 5,336,252 proposes another approach to preventing forgeries of infrared bar codes. In U.S. Pat. No. 5,336,252 the infrared bar code is covered with a layer of an ink that has high absorption in the visible and is transparent to the infrared. One embodiment is an ink prepared by mixing and dispersing a white pigment, such as titanium oxide or zinc oxide, with an extender such as calcium carbonate. While this approach will make it more difficult to forge the bar code, once the presence of the barcode is detected, it is not forgery proof.

All the above inventions relate to encoding the information in a marking created by depositing onto a medium a material that is capable of strongly absorbing radiation over a range of infrared wavelengths and substantially non-absorbing in the visible wavelengths. The necessity of strong absorption is derived from the decoding requirement that the reflectance, in the infrared range of wavelengths, from the infrared absorbing material is significantly different than that from the medium. This requirement will ensure that the electrical signal from the detector that receives the reflected infrared radiation is sufficiently distinct from the background noise so that it can be reliably decoded.

The large group of materials that are capable of mildly absorbing radiation over a range of infrared wavelengths and substantially non-absorbing in the visible wavelengths, such as most synthetic polymers (for example, polystyrene, Polyethylene terethalate), do not find application in the encoding of information as markings on a medium since the resulting electrical signal would not be sufficiently distinct from the background noise to be reliably decoded if read with the optical reader previously described. These large group of materials includes many low cost materials that would be attractive candidate materials if the information encoded in marks could be decoded.

The object of the present invention is to present methods for the use of lower cost, stable materials to encode information onto or on a base medium, and method and apparatus for reading the encoded information while retaining robustness to forgeries.

SUMMARY OF THE INVENTION

Information is encoded in markings on a base medium by depositing or intertexturing on the base medium a material where the surface dimensions, thickness and presence of the material contain the encoded information. In this invention, the material is capable of mildly absorbing radiation over a wide range of infrared wavelengths and substantially non-absorbing in the visible wavelengths. The encoding utilizes a lower cost, more stable material than a material that is capable of highly absorbing over a range of infrared wavelengths and substantially non-absorbing in the visible wavelengths. Inventive methods are then needed to ensure that the electrical signal from the detector that receives the infrared radiation reflected or transmitted from the medium and material disposed thereon is sufficiently distinct from the background noise so that it can be reliably decoded. Two different approaches for embodiments of such inventive methods are disclosed. In all embodiments disclosed, at least one of a plurality of sources of radiation is scanned over the medium and material disposed thereon, wherein said sources emit infrared radiation over a range of frequencies. Also in all embodiments disclosed, a portion of the radiation is reflected or transmitted from the medium and material disposed thereon, said reflected portion having a variable intensity over the scan. The reflected or transmitted portion is collected at a detector.

For one embodiment, the electrical signal from each of the at least one of a plurality of detectors is sampled at each of a plurality of spaced apart locations on the medium and material disposed thereon, the position of such locations being along the scan. At each of the plurality of spaced apart locations on the medium and material disposed thereon, the reflectance or transmittance at a plurality of select wavelengths, selected from the range of wavelengths emitted by the at least one of a plurality of sources, is determined. Knowledge of the reflectance or transmittance at a plurality of select wavelengths, which is the same as knowledge of the reflectance or transmittance spectrum at a plurality of select wavelengths, allows the use of spectrum identification methods, such as neural networks or principal component analysis, to identify the thickness and presence of the material at each of the plurality of spaced apart locations. Once the presence of the material at each of the plurality of spaced apart locations has been identified, the surface dimensions of the material can be deduced from the presence of the material at each of the plurality of spaced apart locations. From the thickness and surface dimension of the material, the encoded information can be decoded.

In another embodiment, the material disposed on the medium exhibits at least one relative absorption maximum in the infrared in addition to being capable of mildly absorbing radiation over a wide range of infrared wavelengths and substantially non-absorbing in the visible wavelengths. (The relative absorption maximum could be narrow or broad). The range of detectable wavelengths in the radiation reflected or transmitted from the medium and material deposited thereon is restricted. In one version of this embodiment, the restriction is selected to include one relative absorption maximum in the infrared. The restricted portion of the reflected or transmitted radiation is collected at a detector where it is generates an electrical signal, said signal having a variable intensity over the scan. The thickness and presence of the material are identified from the electrical signal. From the thickness and surface dimension of the material, the encoded information can be decoded.

In another version of the second embodiment, an oscillation is induced in the intensity of the restricted portion of the reflected or transmitted radiation collected at a detector, said oscillation having characteristics that vary along the scan. Inducing the oscillation in the collected radiation provides the opportunity to use known methods to increase the signal-to-noise ratio of the electrical signal corresponding to the collected radiation. After this step, the method is the same as the preceding version of the embodiment.

Apparatus providing means to perform the steps of each of the above described method are disclosed.

BRIEF DESCRIPTION OF THE DRAWINGS

The novel features of this invention are set forth in the appended claims. However, the invention will be best understood from the following detailed description when read in connection with the accompanying drawings wherein:

DETAILED DESCRIPTION

Figure 1A:
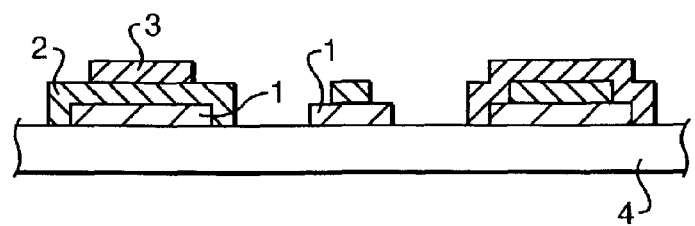
FIGS. 1A–1D are respectively a graphical representation of the cross section of a three dimensional bar code, the cross sectional view of a two dimensional bar code, the top view of an area marking, the top view of an intertextured structure.
Figure 1B:
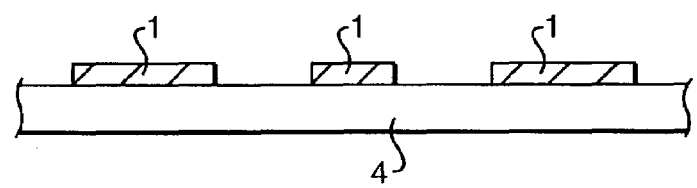
Figure 1C:
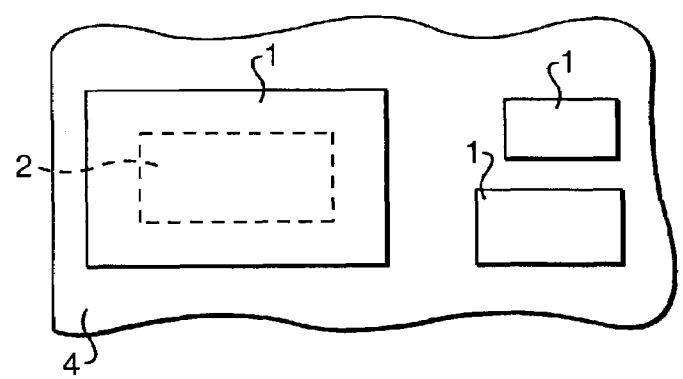
Figure 1D:
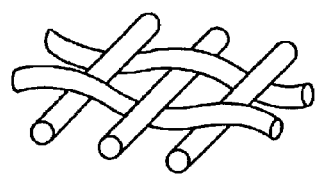
Figure 2A:
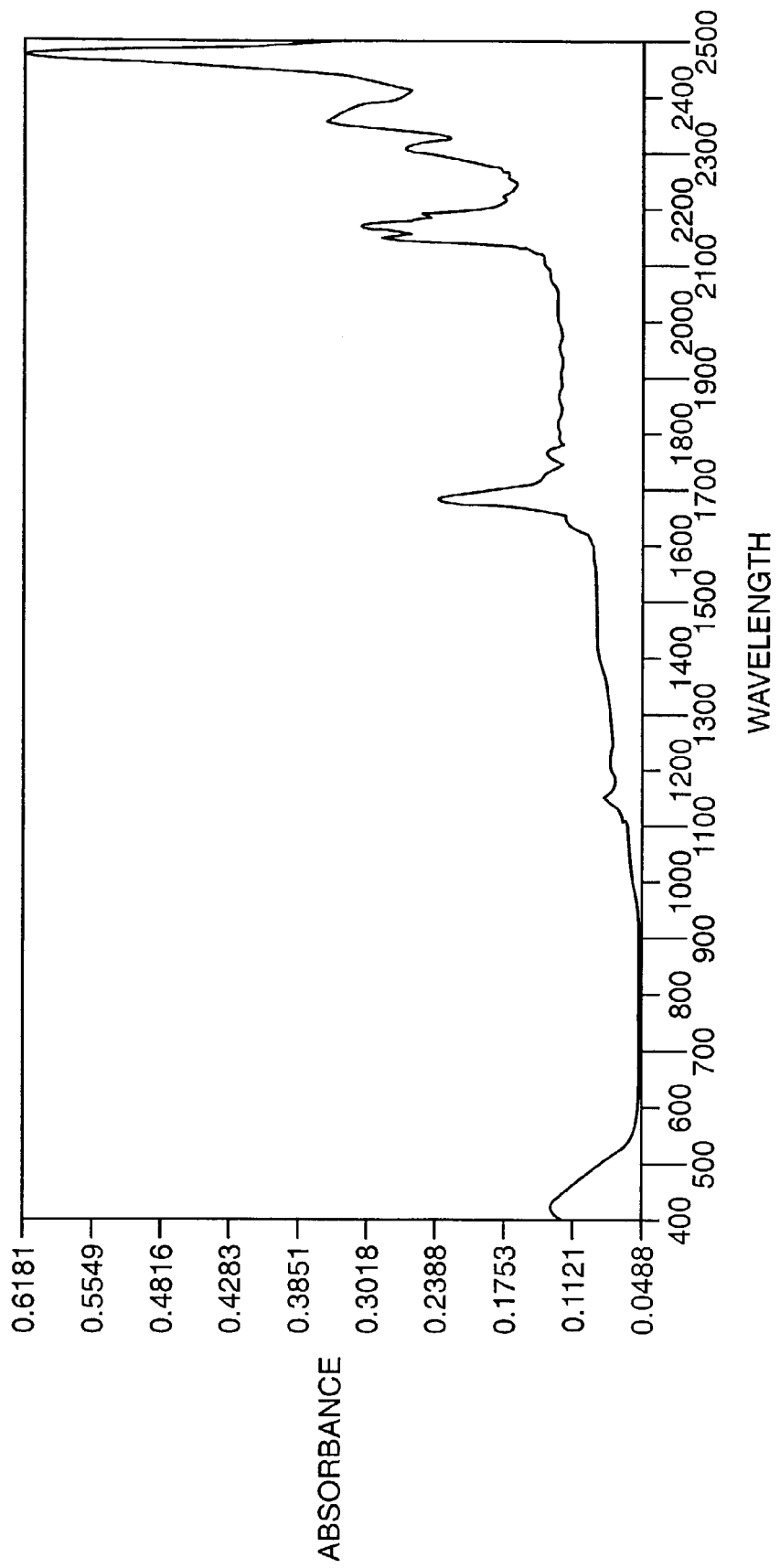
FIGS. 2A–2D depict the spectra of several materials typical of those used in this invention.
Figure 2B:
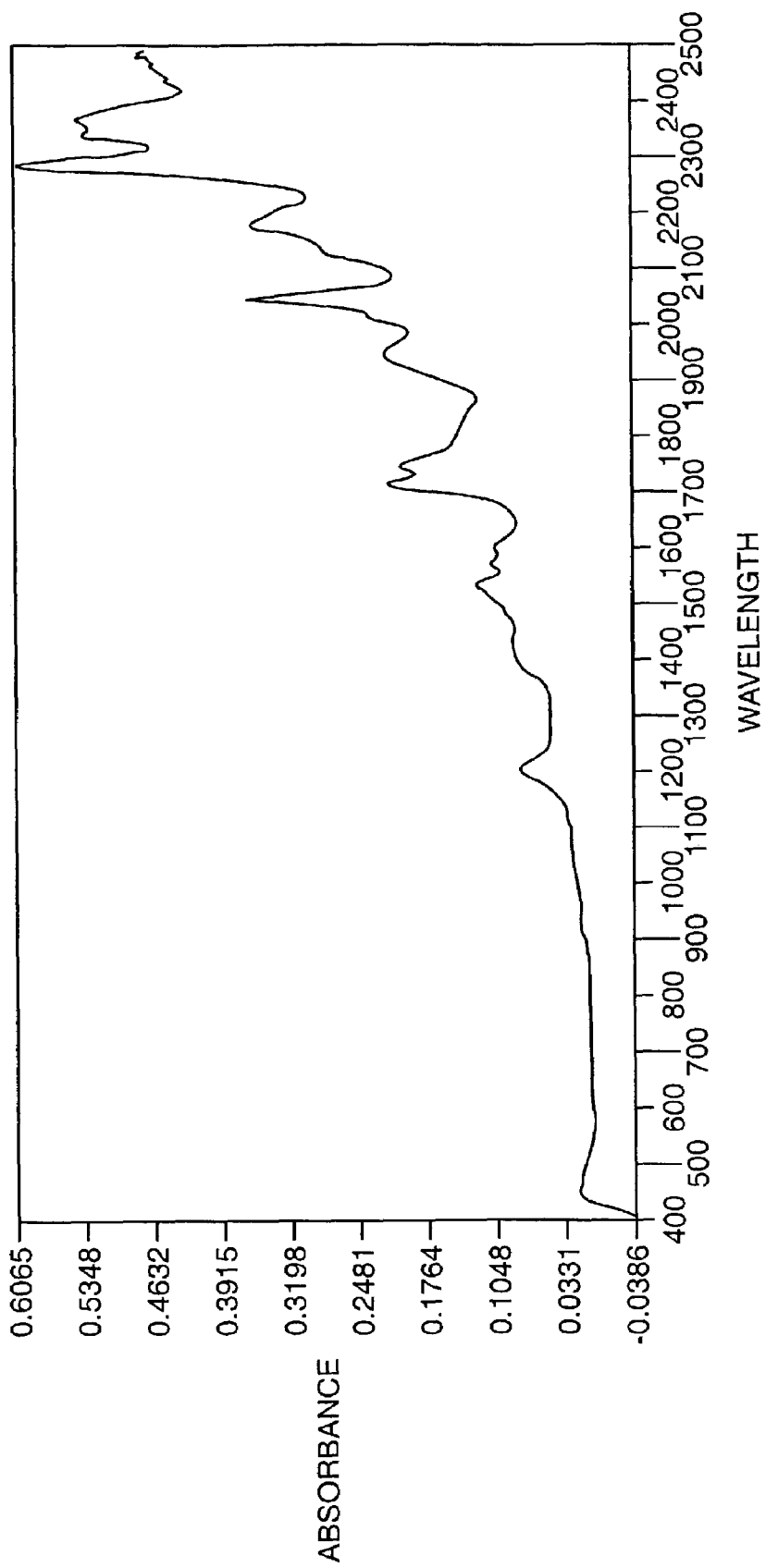
Figure 2C:
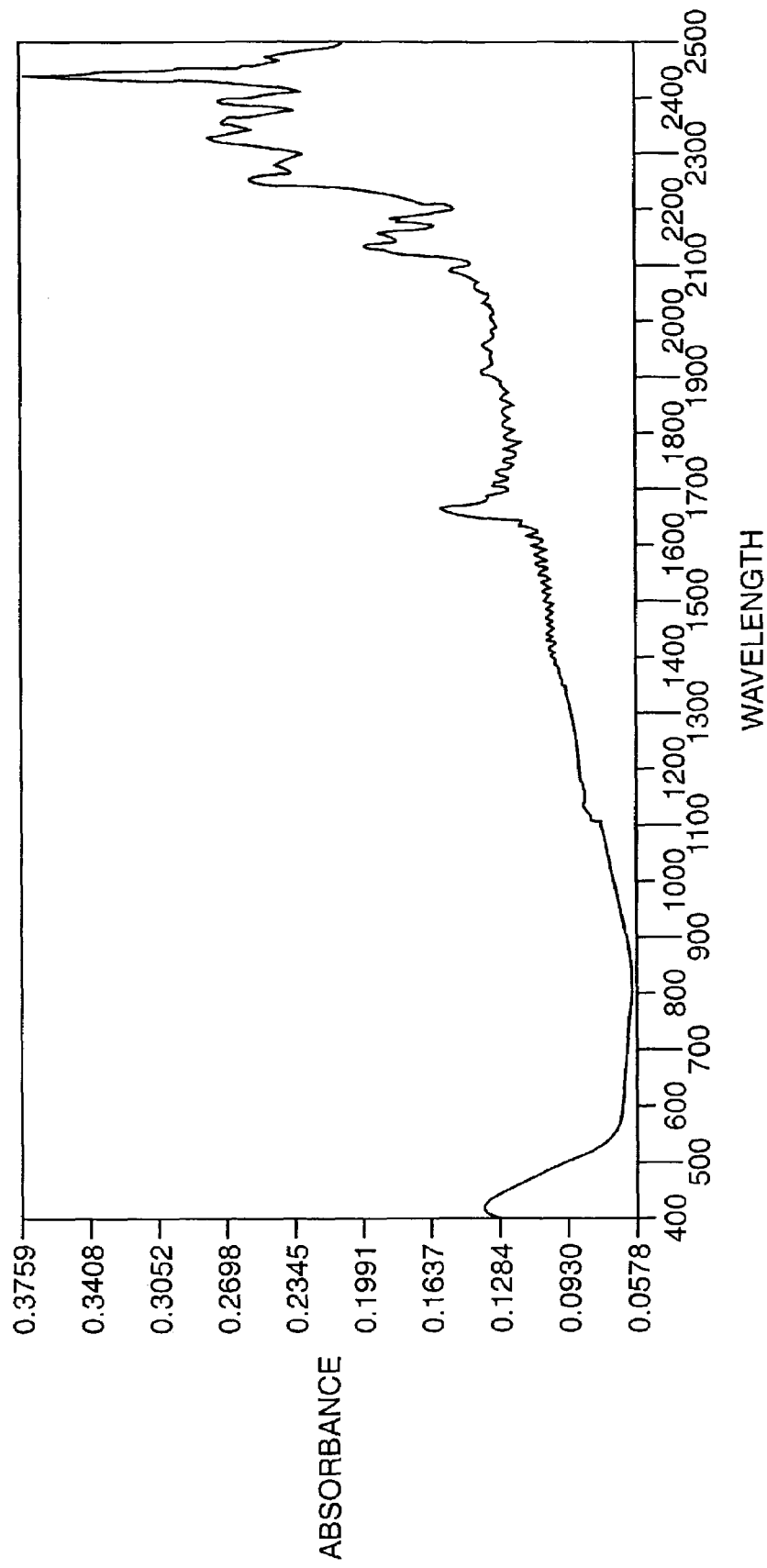
Figure 2D:
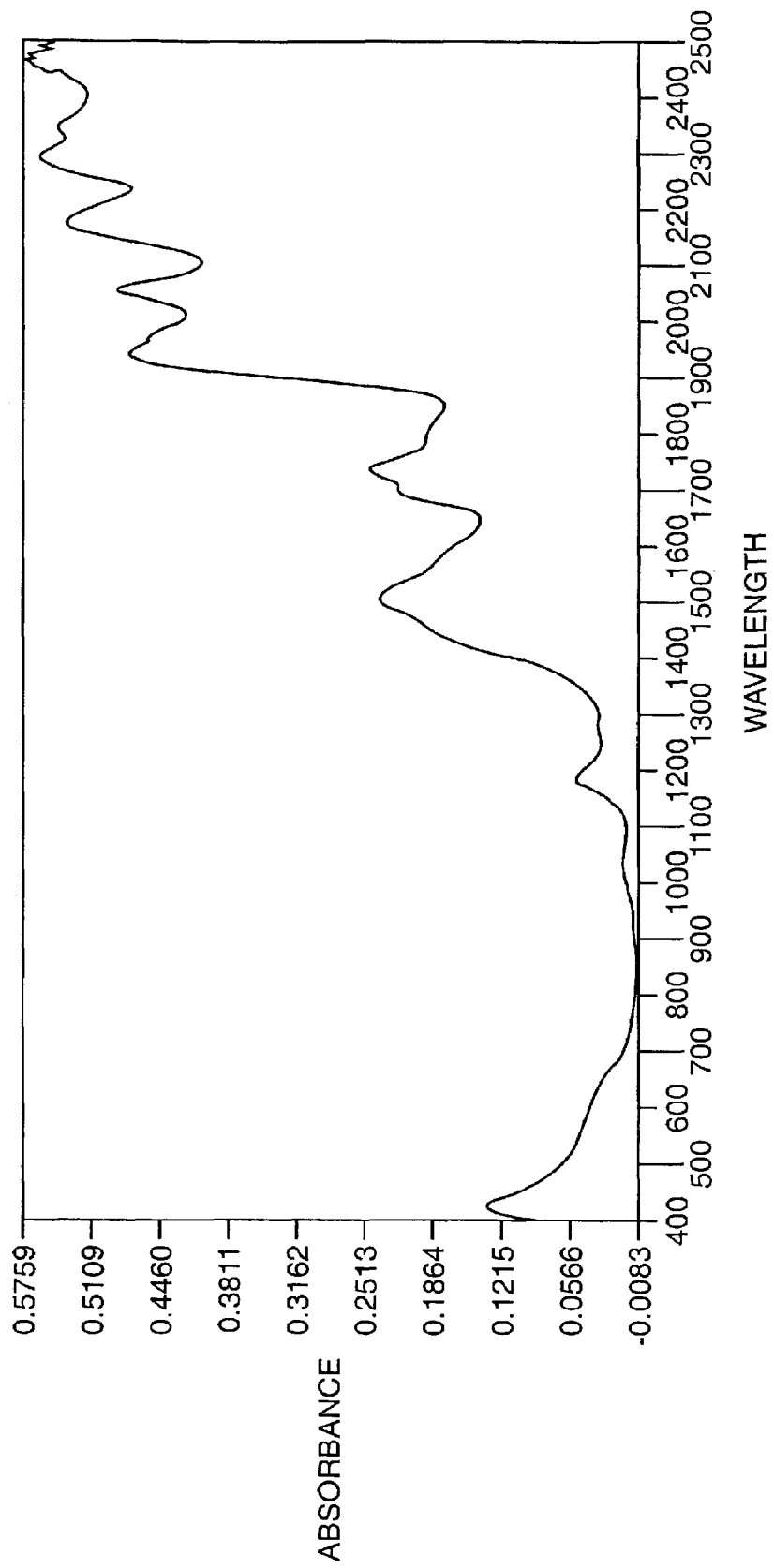

In many applications where identifying product information for purchasing and inventory control or personal or security information in ID cards is provided, the information is encoded in markings on a base medium by depositing or intertexturing on the base medium a material where the surface dimensions and thickness of the material contain the encoded information. Examples of such markings are bar codes, area markings or three dimensional bar codes. FIG. 1A depicts the cross section of a three dimensional bar code, where 1, 2, 3 are different materials used for encoding information and 4 is a base medium. FIG. 1B depicts the cross sectional view of a two dimensional bar code; FIG. 1C depicts a top view of an area marking. FIG. 1D depicts the top view of an intertextured structure.

Figure 3:
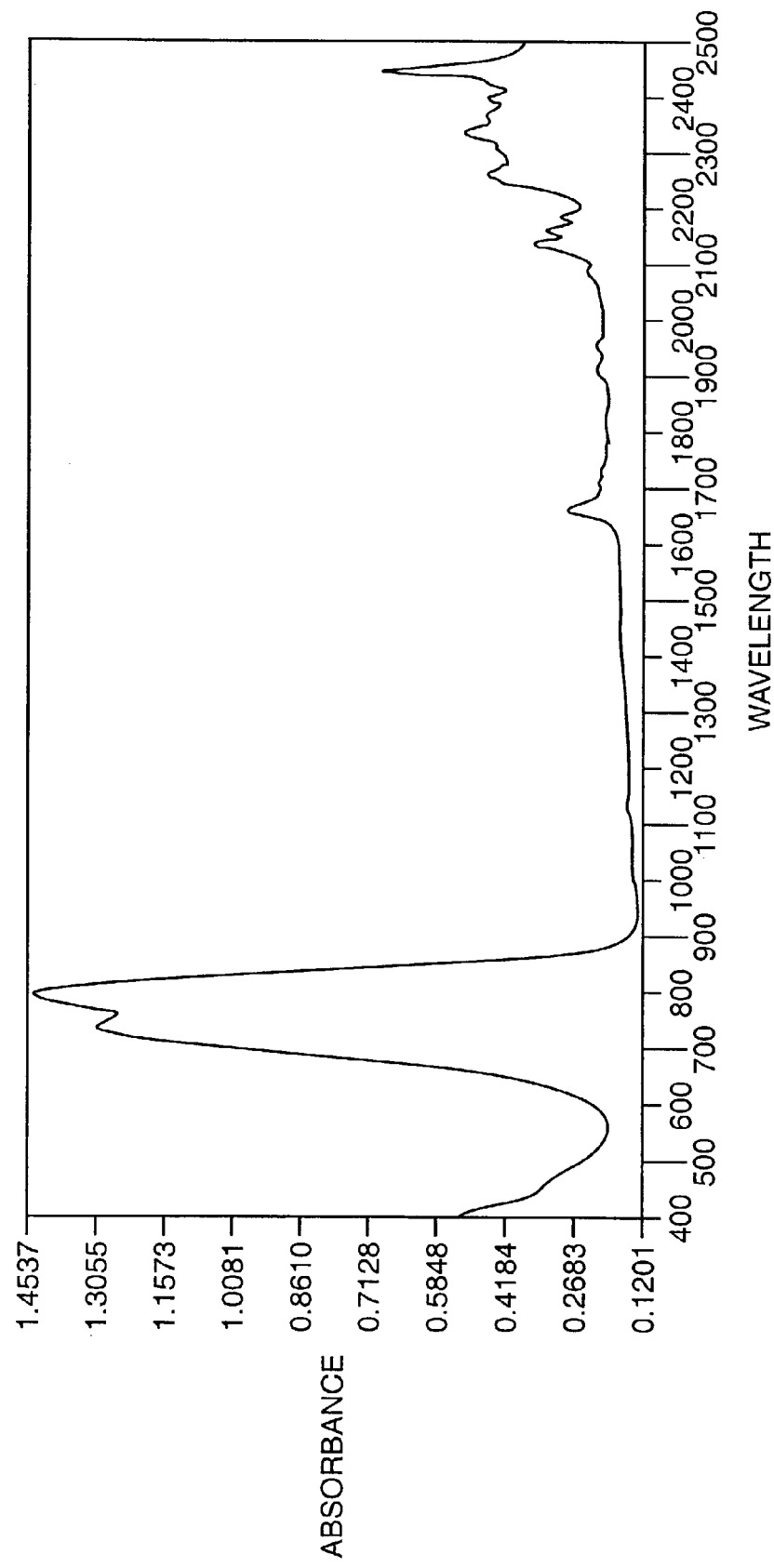
FIG. 3 depicts the spectrum of a material having a high narrow absorption peak in the infrared.
Figure 4:
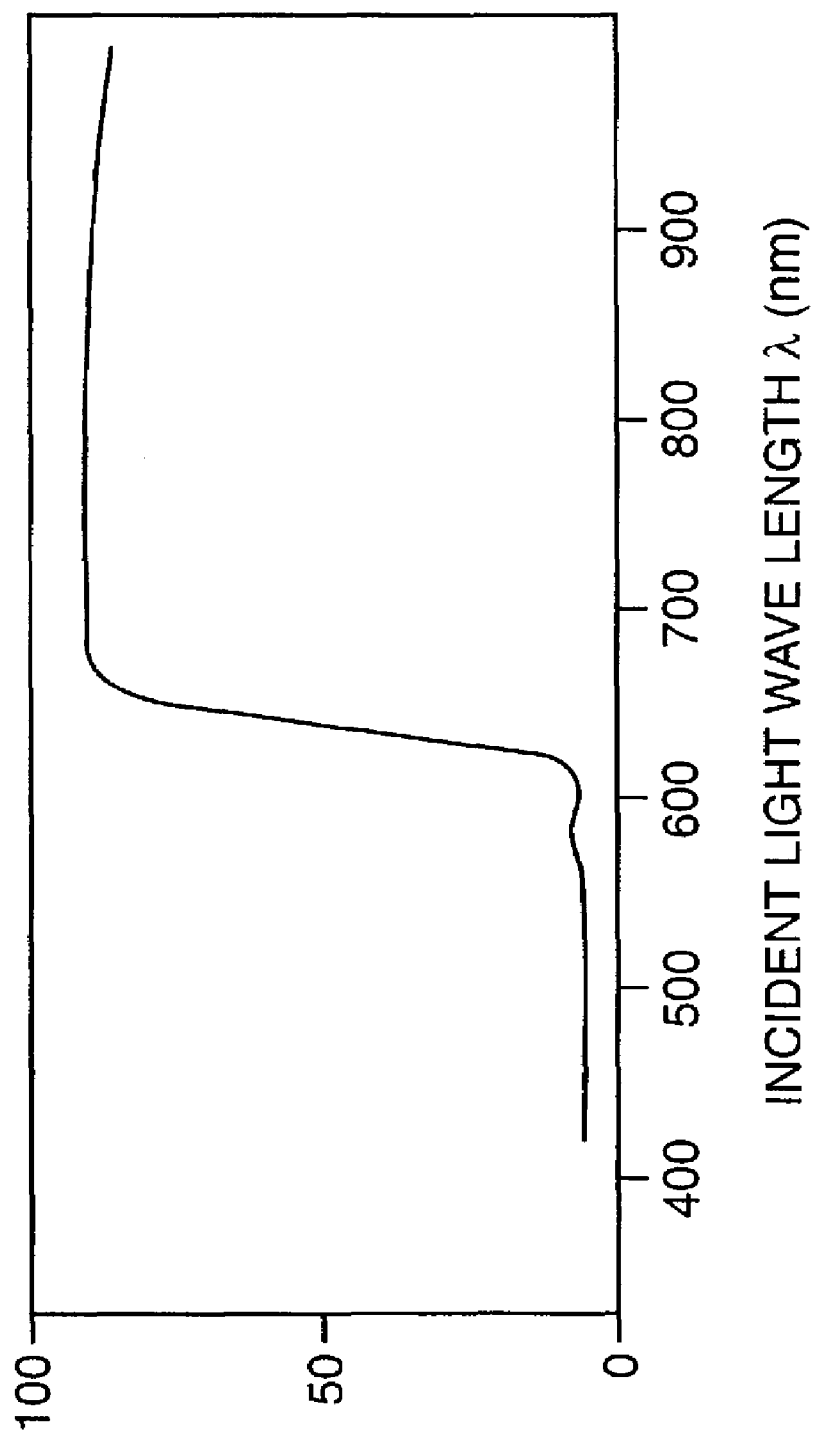
FIG. 4 depicts the spectrum of a material that has high absorption in the infrared.

The materials used in encoding information in the present invention, such as in the examples depicted in FIGS. 1A–1D, are capable of mildly absorbing radiation over a wide range of infrared wavelengths, may exhibit at least one relative absorption maximum in the infrared, and are substantially non-absorbing in the visible wavelengths. The difference between a mildly absorbing material that may exhibit at least one relative absorption maximum in the infrared and a highly absorbing material is based on the physical cause of the absorption. Highly absorbing materials derive their absorption coefficient from electronic resonance while mildly absorbing materials derive their absorption coefficient from vibrational resonance and overtones. This definition becomes apparent upon comparison of the infrared absorption spectra of the materials. The spectra of materials typical of those used in this invention are shown in FIGS. 2A–2D. In contrast to those materials used in the present invention, FIG. 3 depicts the spectrum a material having a high narrow absorption peak in the infrared and FIG. 4 depicts the spectrum of a material that has high absorption in the infrared.

The materials used in the present invention include but are not limited to transparent polymers, for example poly(isobutylmethacrylate). Synthetic polymers are excellent candidate materials since the overtones from the vibrational motion from the hydrogen stretch normal mode of C—H, N—H and O—H lead to absorption in the near infrared (NIR). Categories of materials and examples of such include but are not limited to those given in Table 1. These materials are capable of mildly absorbing radiation over a wide range of infrared wavelengths and are substantially non-absorbing in the visible wavelengths. Polyethylene terethalate (PET) and polystyrene are examples of materials that are capable of mildly absorbing radiation over a wide range of infrared wavelengths, are substantially non-absorbing in the visible wavelengths and exhibit at least one relative absorption maximum in the infrared.

TABLE 1

Materials for NIR Markings
Materials for NIR Markings

| General Category | Sub-Category | Examples |
|---|---|---|
| Main Chain Acyclic Carbon Polymers | Poly(dienes) | Polybutadiene Polyisoprene |
| | Poly(alkenes) | Poly(butene-1) Polyethylene Poly(propylene) |
| | Poly(acrylics) | Polyacrylic acid Poly(butylacrylate) |
| | Poly(acrylamides) | Poly(N-butylacrylamide) |
| | Poly(methacrylics) | Poly(butylmethacrylate) Poly(methylmethacrylate) |
| | Poly(methacrylamides) | Poly(N-tert-butylmethacrylamide) |
| | Poly(vinyl ethers) | Poly(vinylmethyether) |
| | Poly(vinyl thioethers) | Poly(methylthioethylene) |
| | Poly(vinyl alcohol) & Poly(vinyl ketones) | Poly(vinyl alcohol) Poly(benzoylethylene) |
| | Poly(vinyl halides) & Poly(vinyl nitriles) | Poly(vinyl chloride) Poly(acrylonitrile) |
| | Poly(vinylesters) | Poly(benzoyloxyethylene) |
| | Poly(styrenes) | Poly(4-butylstyrene) Poly(α-methylstyrene) Poly(styrene) |
| | Others | Poly(vinyl carbazole) Poly(phenethylethylene) |
| Main-Chain Carbocyclic Polymers | Poly(phenylenes) | Poly(2,5-dimethyl-1,4-phenyleneethylene) |
| Main-Chain Acyclic Heteroatom Polymers | Poly(oxides) | Poly(oxyethylene) Poly(oxypropylene) Poly(phenylene oxide) |
| | Poly(carbonates) | Polycarbonate of bisphenol A |

TABLE 1-continued

Materials for NIR Markings
Materials for NIR Markings

| General Category | Sub-Category | Examples |
|---|---|---|
| | Poly(esters) | Poly(ethylene terephthalate) |
| | Poly(anhydrides) | Poly(oxyisophthaloyl) |
| | Poly(urethanes) | Poly(oxycarbonylimino-decamethyleneimino-carbonyloxyhexa-decamethylene) |
| Main-Chain O-Heteroatom Polymers | Poly(siloxanes) | Poly(dimethylsiloxane) |
| Main-Chain —C—(S)—C— and —C—S—N— Polymers | Polysulfides | Poly(thio-1,3,-cyclohexylene) |
| | Poly(sulfones) | Poly(oxy-1,4-phenylenesulfonyl-1,4-phenylene) |
| Main-Chain —C—N—C— Polymers | Poly(amides) | Nylon 6 Nylon 6,6 Poly(benzyl glutamate) |
| | Poly(imines) | Poly(benzoyliminoethylene) |
| | Poly(ureas) | Poly(ureylenemethylene-1,4-phenylenemethylene ureylenedecamethylene) |
| Other Inorganic Polymers | Poly(phosphazenes) Poly(silanes) Poly(germanes) Poly(stannates) Poly(titanates) | |
| Main-Chain Heterocyclic Polymers | Poly(benzoxazoles) Poly(quinoxalines) Poly(benzimidazoles) Poly(oxindoles) Poly(triazines) Poly(pyridines) Poly(piperidines) Poly(triazoles) Poly(pyrazoles) Poly(pyrrolidines) Poly(phthalides) Poly(fluoresceins) Poly(dibenzofurans) Poly(anhydrides) | |
| | Carbohydrates | Amylose triacetate Cellulose Cellulose triacetate Ethyl Cellulose Xanthan Dextran |
| Natural Polymers | Alkyd & fossil resins | Amber, kauri, congo, damar, ester gum |
| | Natural rubber | Polyisoprenes |
| | Animal proteins | Wool, silk, gelatin, collagen, |
| | Regenerated proteins | Lanital, ardil, aralac, vicara, rayon etc |
| | Vegetable cellulosic fibers | Cotton, kapok, abaca, agave, falx, hemp, jute etc |
| | Enzymes | Lysozome, trypsin, chymotrypsin |
| | Waxes | Carnuba wax, paraffin wax |
| | Complex Carbohydrates | Starch, cellulose, glycogen, carrageenan, agar, xylan, chitin, amylose |

Table 1 lists a large number of polymers that are primarily homopolymers. The materials for this invention can include physical mixtures or blends of many of these polymers. They can also include copolymers of many of the monomers used to synthesize the polymers listed in Table 1. The copolymers can be prepared from the monomers, by grafting reactions, block and other typical coplymerization and polymer reaction pathways well known in the art (for the polymer reactions see R. W. Lenz, *Organic Chemistry of Synthetic High Polymers*, ISBN470-52630-0.). The polymer layer can also include typical plastic additives. Examples of additives are given below in Table 2.

TABLE 2

Additive Materials for NIR Markings
Additives for NIR Markings

| General Category | Sub-Category | Examples |
| --- | --- | --- |
| Processing additives | Processing stabilizers | Irganox 1010, Ionox 330, Polygard |
| | Lubricants | Stearic acid |
| | Flow promoters | acrylates |
| | Thixotropic agents | Silica flour, bentonite clays |
| Mechanical property modifiers | Plasticizers | Di-octyl phthalate, adipic acid polyesters |
| | Reinforcing fillers | Glass, silicon carbide, graphite |
| Cost reducing additives | Particulate fillers | |
| | Diluents or extenders | |
| Surface property modifiers | Anti-static agents | Quarternary ammonium salts, polyhydric alcohols and derivatives |
| | Slip additives | Waxes |
| | Anti-wear additives | |
| | Anti-block additives | |
| | Adhesion promoters | |
| Anti-ageing additives | Anti-oxidants | Irganox 1010, Ionox 330, Polygard |
| | u.v. stabilizers | |
| | Fungicides | |
| Others | Blowing agents | |
| | Flame retardants | |

Figure 5:
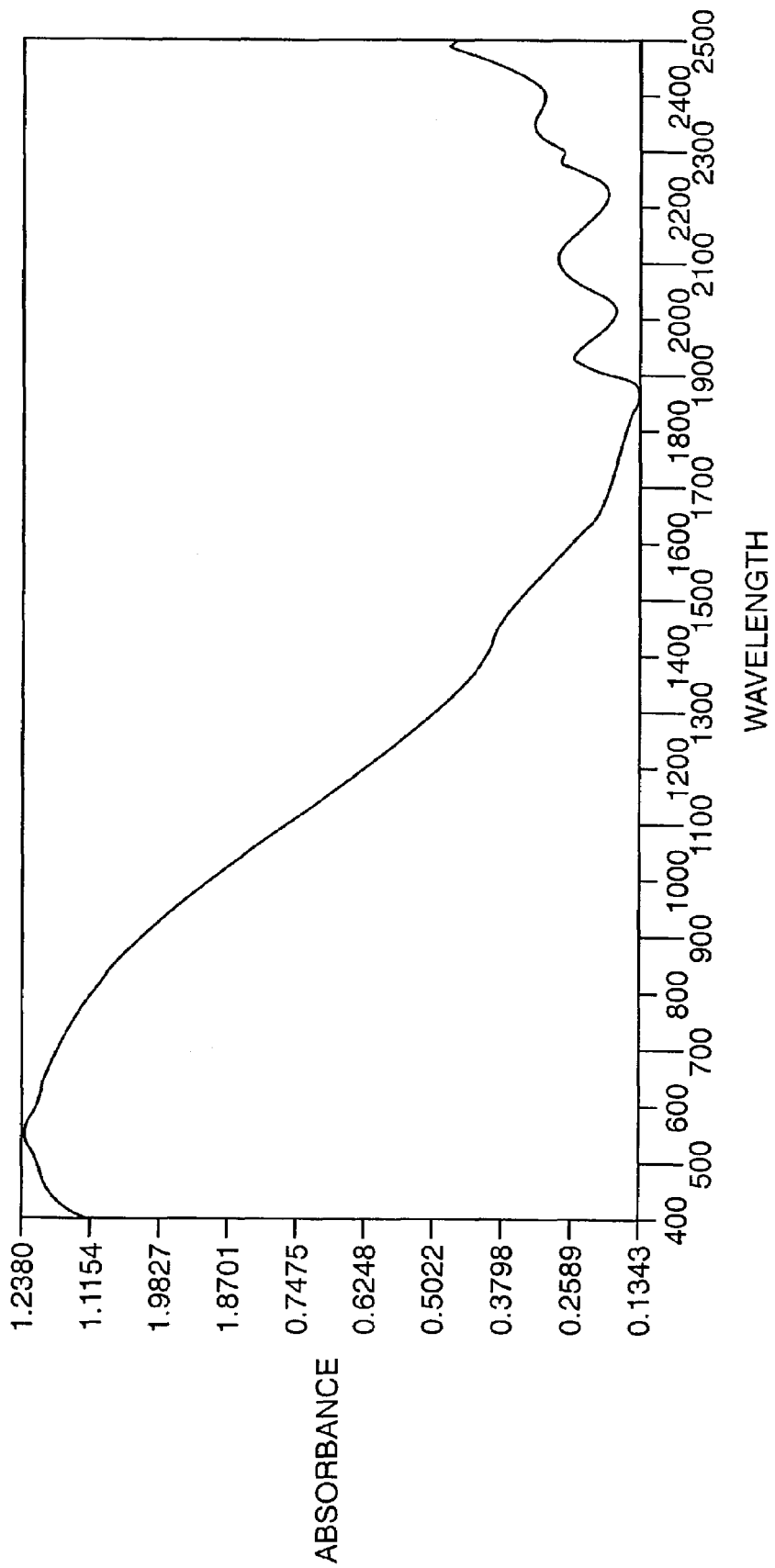
FIG. 5 depicts a typical spectrum of a planarizing material that is substantially differentiated in the infrared wavelengths from the materials used in this invention.

While these materials can be used for encoding information since they are capable of mildly absorbing radiation over a wide range of infrared wavelengths, it is possible to attempt to decode an encoded marking of this invention by its topography. This concern could be answered by depositing over the marking a planarizing layer of material. The planarizing material should be substantially differentiated in the infrared range of wavelengths from the first material (the material capable of mildly absorbing in the infrared). Examples of such planarizing materials are most colored inks and combination of those inks that would render a visible black color. A typical spectrum of a planarizing material that is substantially differentiated in the infrared range of wavelengths from the at least one of a plurality of first materials, black ink from a commercial marker (Paper-Mate W10 permanent marker), is shown in FIG. 5. Another example of a planarizing layer is an ink prepared by mixing and dispersing a white pigment, such as titanium oxide or zinc oxide, with an extender such as calcium carbonate, as previously described in the background section of this application.

In cases where secure or not visible information is desired in addition to the visible markings, the present invention provides for depositing at least one layer of material that: is capable of mildly absorbing radiation over a wide range of infrared wavelengths, may exhibit at least one relative absorption maximum in the infrared, and is substantially non-absorbing in the visible wavelengths, over or under or beside a layer of material that is capable of absorbing in the visible and substantially differentiated in the infrared from the first material. If the infrared absorbing material or plurality of materials is located underneath the material that absorbs in the visible, a planarizing layer could be necessary. Such a planarizing layer would be chosen to provide contrast while reading the visible markings. The planarizing material should be substantially differentiated in the infrared range of wavelengths from the first materials (the material capable of mildly absorbing in the infrared).

As should be apparent to those skilled in the art, the present invention can be combined with other materials in order to encode additional information besides the visible marking.

If, in order to enhance detectability or to encode other information, it is desired to provide information encoded with materials that are strongly absorbing in the infrared, the present invention provides for depositing a layer of material that: is capable of mildly absorbing radiation over a wide range of infrared wavelengths, may exhibit at least one relative absorption maximum in the infrared, and is substantially non-absorbing in the visible wavelengths, over or under or beside a layer of material that is capable of strongly absorbing in the infrared and substantially non-absorbing in the visible.

Means of depositing the information carrying material, in the case of a single layer of information carrying material, or depositing each of the plurality of materials, in the case of a multi-layer marking, onto the surface of the medium include but are not limited to ink jet deposition, thermal transfer, vacuum deposition, pressure applied transfers (such as rub-on material), gravure printing, offset printing and screen printing. As it is clear to those schooled in the art, the deposition process includes providing sources of the materials.

In one embodiment of the present invention, PVC or PVA is coated onto a donor ribbon. The material is subsequently transferred to the base medium by means of a thermal transfer printer.

In another embodiment of the present invention, a clear ink is formulated with the preferred material (as described in this invention) as the binder. The material is then printed onto the base medium using an ink jet printer.

In, still, another embodiment of the present invention, a wax is deposited onto the base medium using a hot melt (thermal wax) printer mechanism.

From the second of the above embodiments, it is apparent that the method of this invention could be practiced by formulating a mixture of preferred materials (materials such as described in this invention) in varying proportional ratios, or in a combination with other materials, and encoding information by the presence or absence of the materials. It is also possible to encode information in the surface dimensions and thickness. Also, the present invention can be combined with other materials in order to encode additional information besides the visible marking. One embodiment would be a material consisting of a visible dye in a binder material wherein the binder material can be varied and belongs to the class of materials described above (capable of mildly absorbing radiation over a wide range of infrared wavelengths, possibly exhibiting at least one relative absorption maximum in the infrared, and are substantially non-absorbing in the visible wavelengths.) Means of intertexturing the information carrying material, in the case of a single layer of information carrying material, or intertexturing each of the plurality of materials, in the case of a multi-layer marking, with the base medium include but are not limited to interweaving, embroidering and similar methods.

An embodiment of marking by intertexturing would consist of two different fabrics (wool on cotton, or on synthetic material, for example) interwoven so as to create a marking.

As can be seen from FIGS. 2, 3, and 4, the absorption of the materials being used in this invention is significantly smaller than those materials that are capable of strongly absorbing radiation over a range of infrared wavelengths and substantially non-absorbing in the visible wavelengths. Thus, in order to decode the information, means of increasing detectability are required. The means of increasing detectability disclosed and claimed in this invention can be categorized as either means of recognizing the presence of the material or means of conditioning the signal so that known techniques of detection, such as bandwidth narrowing, can be applied successfully.

Detection by Recognition Techniques

The distinguishing characteristic of the materials being used for encoding information in this invention is a spectrum that exhibits mild absorption of radiation over a wide range of infrared wavelengths and substantially no absorption in the visible wavelengths. Thus, a characteristic to detect in order to identify the thickness and presence of the material is the spectrum in the infrared.

Figure 6:
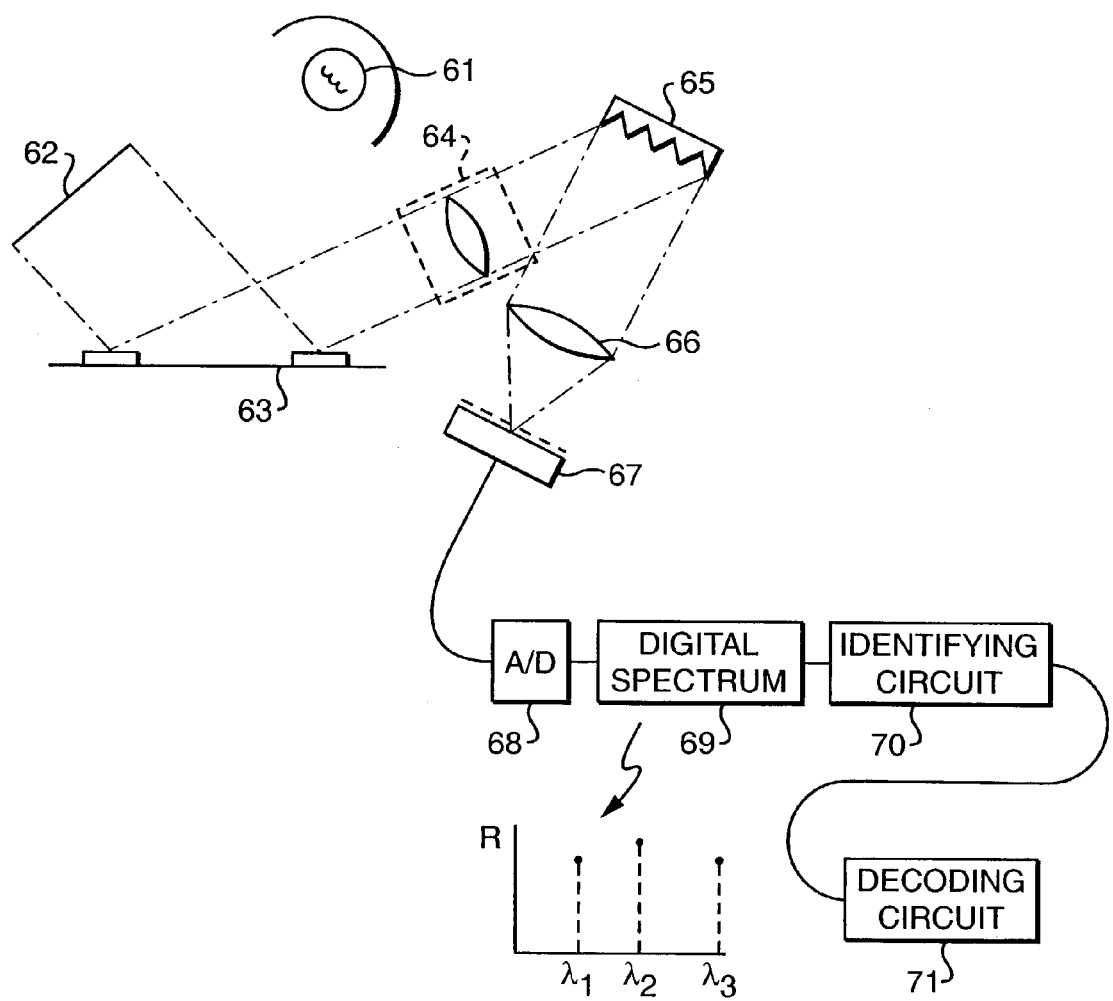
FIG. 6 is a graphical schematic representation of an apparatus used for retrieving the information encoded in a marking by detecting the spectrum in the infrared from the marking on a medium.

FIG. 6 depicts a set-up for retrieving the information encoded in markings by detecting the spectrum in the infrared from a marking on a medium. Referring to FIG. 6, a source of radiation 61 that emits infrared radiation over a range of frequencies, such as a halogen lamp or a tungsten lamp, a DC arc lamp, or a pulsed xenon arc lamp, is directed towards scanning means 62, such as a mirror galvanometer, rotating mirrors, rotating mirror prisms, acousto-optical scanning systems, and holographic scanning systems. (See O'Shea, *Elements of Modern Optical Design*, ISBN 0-471-07796-8, pp. 282–311). A plurality of sources of radiation, such as an array of lasers emitting at select wavelengths could also be used as sources of radiation. The scanned radiation illuminates a marking 63, such as a bar code, an area marking or a two dimensional bar code, and a portion of the radiation is reflected or transmitted from the marking, said reflected portion having a variable intensity over the scan. Optical elements 64 direct the reflected portion of the radiation to an element 65, such as a grating or a plurality of gratings or a prism, that disperses the radiation into a plurality of select wavelengths in the infrared. The plurality of select wavelengths is taken from the range of wavelengths emitted by at least one of the sources of radiation. Optical elements 66 focus the reflected dispersed radiation onto an array of detectors 67, where the reflected dispersed radiation is collected and converted into electrical signals. The detector signals correspond to the plurality of select wavelengths. One embodiment of the detectors would be lead sulfide detectors. Other possible embodiments are pyroelectric detectors (using detector materials such as tryglycerine sulfide, strontium barium niobate, polyvinylidene flouride or lithium tantalate), focal plane arrays using materials sensitive in the near infrared (such arrays need an operating temperature lower than ambient) or InGaAs detectors.

Figure 7:
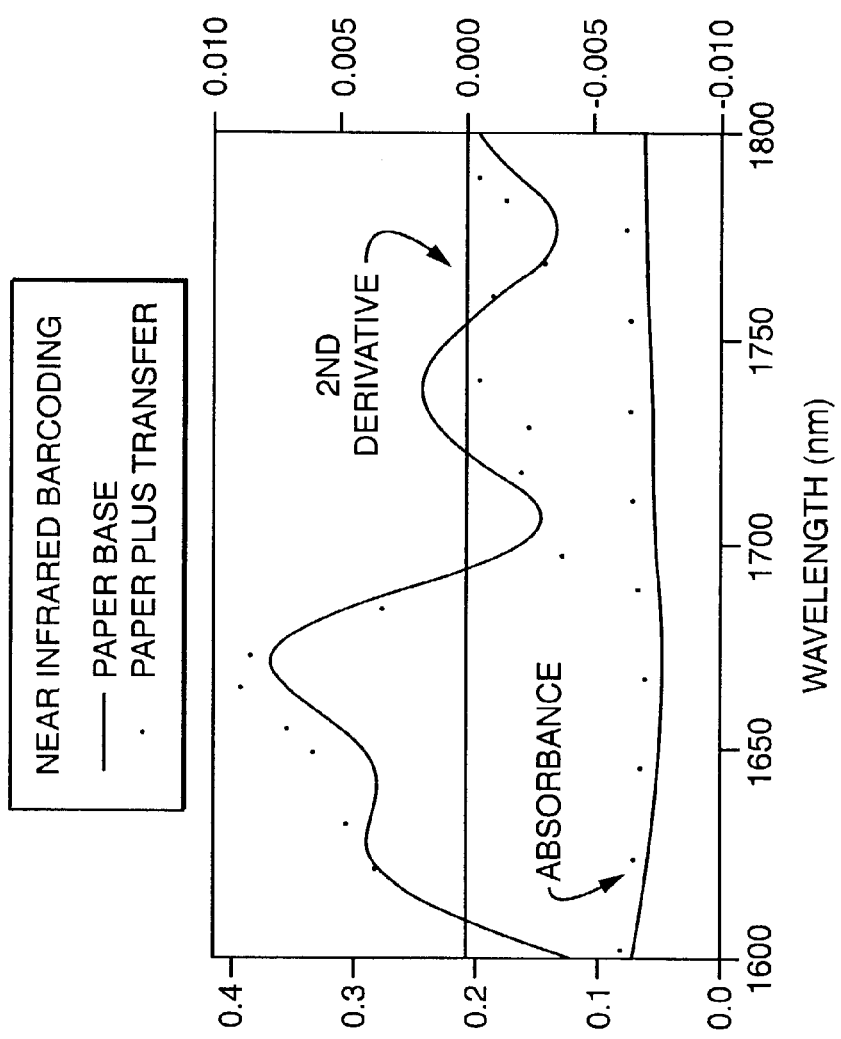
FIG. 7 depicts a spectrum and its second derivative.

A/D circuits 68 convert the analog electrical signals to signals defined at spaced apart points corresponding to the spaced apart locations on the medium and material disposed thereon. The placement of said locations is along the scan. At each of the spaced apart points, the plurality of electrical signals determines the absorption (or equivalently reflectance or transmittance) spectrum at select wavelengths 69. In a refinement of this embodiment, characteristics of the spectrum are calculated after obtaining the spectrum. One such characteristic is the second derivative. Other possible characteristics are the first derivative, third derivatives or higher derivatives. Such characteristics are useful if the spectrum is not easily separated from the spectrum of the base medium. FIG. 7 depicts such a case and illustrates the advantage of using a second derivative of the spectrum to differentiate the material from the base medium.

While FIG. 6 depicts the reflected radiation case, it is obvious to those schooled in the art that the transmitted radiation could be used instead. In the transmitted case, the transmitted portion of the radiation is dispersed into a plurality of select wavelengths in the infrared. The transmitted dispersed radiation is collected and converted into electrical signals. The detector signals correspond to the plurality of select wavelengths. The identification and decoding steps then proceed in the same manner as for the reflected case.

An identifying circuit 70 receives the absorbency (or equivalently reflectance or transmittance), and its characteristics if any have been calculated, at select wavelengths 69 at each of the spaced apart locations and determines the thickness and presence of the material at each of the spaced apart locations. One embodiment of such an identifying circuit would contain a processor and a memory, where the memory contains spectrum information for the materials used. The processor would be programmed to execute a spectrum identification and calibration calculation where the spectrum is characterized by a technique such as Multiple Linear Regression (MLR), Partial Least Squares (PLS), Principal Component Analysis (PCA). (The Principal Component Analysis calculation is detailed below since it is a spectral data compression technique and is usually combined with other techniques.) The spectrum, that is, the absorbency (or equivalently reflectance or transmittance) at select wavelengths, is compared to the known spectrum of the material deposited on a medium or intertextured with a base medium and to the known spectrum of the base medium. This comparison involves applying techniques of pattern recognition such as clustering, Euclidean distance analysis, Mahalanobis distance, neural networks, fuzzy neural networks, fuzzy logic applied to clustering and others. (For example, techniques for pattern recognition are described in Jurs, *Computer Software Applications in Chemistry*, ISBN 0-471-10587-2, Ch. 14, in Otto, *Chemometrics*, ISBN 3-527-29628-X, Ch.5 and Ch. 8 and in Bezdek, Pal, *Fuzzy Models for Pattern Recognition*, ISBN 0-7803-0422-5. For the Mahalanobis distance technique, see Workman, Springsteen, *Applied Spectroscopy*, ISBN 0-12-764070-3, Ch.5).

For identifying both the presence and thickness, both the identification and calibration need to be performed (see Workman, Springsteen, *Applied Spectroscopy*, ISBN 0-12-764070-3, Ch.4, 5). The presence of the material is detected by spectral comparison. The above mentioned techniques of pattern recognition are applied to the measured spectrum. It is sometimes advantageous to decompose the spectrum into principal components before performing the recognition. Multiple Linear Regression (MLR) can also be used to provide a representation of the spectrum. Calibration aims to relate the absorption to concentration, path length and absorbency. Calibration methods include MLR, PLS and Partial Component Regression (PCR). Both PLS and PCR are related to the Principal Component Analysis.

The outputs of the identifying circuit are used to deduce the surface dimensions of the material from presence of the material at each of the plurality of spaced apart locations.

(The deduced surface dimensions can be relative or absolute. An absolute measurement would require pre-existing calibration and might not be necessary for decoding.

For example, the presence of the information carrying material for a given distance or a given area, the distance being represented by a time in the electrical signal, translates into a value "1"; the surface dimension, in this case, is given by the time over which the value is "1".)

From the thickness and surface dimension of the material, the encoded information is decoded by the decoding circuit 71. In one embodiment, the thickness and surface dimensions are translated to a digital signal. For example, for a uniform thickness situation, the presence of the information carrying material for a given distance (or a given area), the distance being represented by a time in the electrical signal, translates into a binary number "1". Deducing means would consist of electrical circuits that implement the representation. Extensions of this embodiment are well known to those skilled in the art.

Decoding means are well known to those skilled in the art. For a digital signal, the decoding can be implemented in a set of digital elements that converts one digital signal to another or it could be implemented using a processor and memory (decoder circuits are described in in Horowitz, Hill, *The Art of Electronics*, ISBN 0-521-23151-5).

It should be apparent to those skilled in the art that the identifying, deducing and decoding means could be implemented in a digital computer with the appropriate programmed software.

Principal Components Analysis

The mathematical basis of principal component analysis is familiar to those skilled in the art (see, for example, Kshirsagar, *Multivariate Analysis*, ISBN 0-8247-1386-9, Ch. 11). A brief summary is given as a basis for the required stored information in the identifying circuit. Principal Components Analysis (PCA) is a method of data reduction in which a spectrum is characterized by its uncorrelated components. In order to generate the stored information, previous calculations are required. The starting point is a description of the spectrum of the each of the materials used to encode the information. Such description contains discrete spectrum values, $S(\lambda_i)$, at discrete wavelengths, $\lambda_i$, at frequent enough intervals to fully describe the spectrum. The spectrum description can be considered a vector, $$\mathbf{s}^T = [S(\lambda_1) S(\lambda_2) \ldots S(\lambda_i) \ldots S(\lambda_n)] \quad (1)$$

where n is number of discrete wavelengths, and $\mathbf{s}^T$ denotes the transpose of the vector $\mathbf{s}$.

The covariance matrix is the matrix defined by $$\rho = \mathbf{s}^T \mathbf{s}, \quad (2)$$

an n×n matrix.

The principal component vectors are the eigenvectors of the covariance matrix; (that is, the vector $\theta$ is the solution to $$\rho\theta = \Lambda\theta. \quad (3)$$

where the $\Lambda$s are the eigenvalues. There are n solutions to this equation, $\theta_i$, i=1 to n. (Methods of solving the eigenvalue-eigenvector problem are well known in linear algebra and can be found in any introductory linear algebra text or a text on linear systems such as De Russo, Roy, Close, *State Variables for Engineers*, Ch. 4).

The spectrum can now be represented as a sum of the eigenvectors, $$\Sigma d_i \theta_i(\lambda), \text{ where the sum extends from 1 to n} \quad (4)$$

The $d_i$s can be determined by inverting a matrix equation.

The eigenvectors can be rank ordered as to importance and typically less than n are needed to characterize the spectrum in the region of interest. For example, k eigenvectors are used to describe the spectrum, where k is less than n. In cases of interest k can be as small as 3. The absorption (or equivalently reflectance or transmittance) spectrum of the medium and material disposed thereon can be represented as $$\Sigma a_i \theta_i(\lambda), \text{ where the sum extends from 1 to k.} \quad (5)$$

The $a_i$s can be completely determined if the number of select wavelengths at which the reflected portion of the radiation is collected is equal to k. In spectroscopy, the representation of equation 5 is called the scores-factors representation, where the $a_i$s are called scores and the $\theta_i(\lambda)$s are called factors.

Comparing the measured spectrum (in its principal component representation) and the spectrum of each material reduces to comparing coefficients. In order to account for variations, fluctuations and measurement noise, pattern recognition techniques (such as clustering, Euclidean distance analysis, neural networks, fuzzy logic processing) can be applied in identifying the presence of the material at each of the plurality of spaced apart locations.

Detection by Conditioning the Signal

Figure 8:
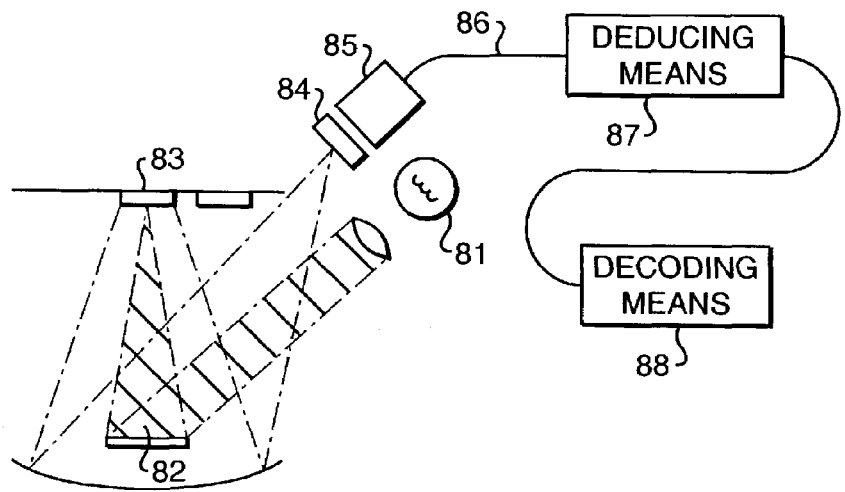
FIG. 8 is a graphical schematic representation of an apparatus used for retrieving the information encoded in a marking where the detection is aided by conditioning the signal by restricting the range of detectable wavelengths.

For materials that in addition to being capable of mildly absorbing radiation over a wide range of infrared wavelengths and substantially non-absorbing in the visible wavelengths also exhibit at least one relative absorption maximum in the infrared, the electrical signal resulting from the collected reflected radiation can be conditioned in order to increase detection. Referring now to FIG. 8, a source of radiation 81 is scanned, using scanning means 82, over a marking 83, consisting of material deposited or intertextured onto a base medium. The source of radiation 81 could be a broad source of radiation that emits infrared radiation over a range of frequencies, such as a halogen lamp or a tungsten lamp or a laser that emits at a desired wavelength. The reflected portion of the radiation is collected at the detector or detectors 85. Examples of infrared detectors include but are not limited to lead sulfide detectors and pyroelectric detectors (using detector materials such as tryglycerine sulfide, strontium barium niobate, polyvinylidene fluoride or lithium tantalate).

While FIG. 8 depicts the reflected radiation case, it is obvious to those schooled in the art that the transmitted radiation could be used instead. In the transmitted case, the transmitted portion of the radiation is collected at the detector or detectors. After the entrance to the detector or detectors, the two cases proceed identically.

Figure 9A:
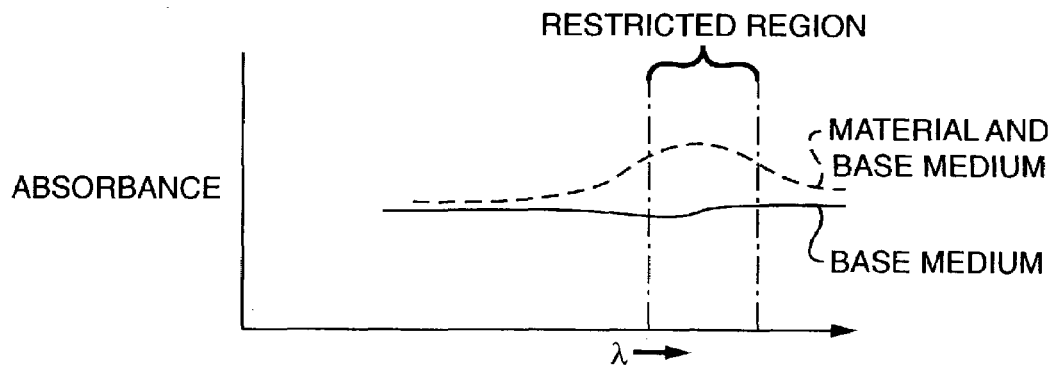
FIGS. 9A–9B depict wavelengths of interest restricted to either one region in the information carrying material exhibiting a relative absorption maximum in the infrared or to two regions, one at the peak of a relative absorption maximum and another at the trough of a relative absorption maximum.

The range of detectable wavelengths in the reflected (or transmitted) portion of the radiation that reaches the detector 85 is restricted to locations in the spectrum exhibiting at least one relative absorption maximum in the infrared by restricting means 84. One embodiment of the restricting means would be at least one optical filter. The filter can be either at the source, or at the detector, or both, or in between, as may be smallest and most convenient. The range also could be restricted at the source by utilizing at least one source that emits only in a range of frequencies (for example, a laser that emits at the desired wavelength). The wavelengths of interest are restricted to a region in the information carrying material, said region exhibiting a relative absorption maximum in the infrared (refer to FIG. 9A).

Reflected radiation from the markings can then be collected optically and delivered onto a detector of any reasonable size. The detector converts the collected reflected radiation to an electrical signal 86. The electrical signal is input to a deducing circuit 87 that produces a signal representing the thickness and presence of the deposited material over the scan. Deducing means are known to those schooled in the electrical arts and include but are not limited to comparing to a threshold, DC removal and zero crossing detection (comparator circuits, which are sometimes used for determining presence, are discussed in Horowitz, Hill, *The Art of Electronics*, ISBN 0-521-23151-5; differentiation and zero crossing detection are also used for edge detection, another technique for presence detection; other techniques should be apparent to those schooled in the instrumentation arts). Finally, a decoding circuit 88 decodes the information encoded in the thickness and surface dimension of the deposited material. By restricting the wavelengths of interest to the region in information carrying material exhibiting a relative absorption maximum in the infrared, a higher contrast is obtained between the signal from the information carrying material and the signal from the base medium. This higher contrast results in improved detectability of the presence of the deposited material.

Again, in one embodiment, the thickness and surface dimensions are translated to a digital signal. For example, for a uniform thickness situation, the presence of the information carrying material for a given distance (or a given area), the distance being represented by a time in the electrical signal, translates into a binary number "1". Deducing means would consist of electrical circuits that implement the representation. Extensions of this embodiment are well known to those skilled in the art.

Decoding means are well known to those skilled in the art. For a digital signal, the decoding can be implemented in a set of digital elements that converts one digital signal to another or it could be implemented using a processor and memory (decoder circuits are described in in Horowitz, Hill, *The Art of Electronics*, ISBN 0-521-23151-5).

It should be apparent to those skilled in the art that the identifying, deducing and decoding means could be implemented in a digital computer with the appropriate programmed software.

One possible embodiment of the deducing means can further include using two detectors (or a pyroelectric detector where the opposing sensitive areas of the pyroelectric detector may be superimposed spatially). The markings are detected by a moving small image of one of the detectors (or one of the pyroelectric elements), but are at the same time viewed by a diffused or defocused (lower resolution) image of the other detector (or opposing pyroelectric element), to enhance detection of the edges (by increasing resolution) of the markings. (In a photographic analogy the same technique is called unsharp masking.) In analogy to unsharp masking, the electrical signal from the diffused image is subtracted from the electrical signal corresponding to the image of the markings to produce a difference (high frequency) electrical signal. An increased resolution electrical signal is obtained by adding a fraction of the difference (high frequency) electrical signal to the electrical signal corresponding to the image of the markings. Since edges are enhanced, if the increased resolution electrical signal is utilized to deduce the thickness and presence of the deposited material over the scan, the probability of detection of the presence of the deposited material should improve.

In the case where a laser or several lasers that emit at the desired wavelengths are used, more power can be used safely in a broadened beam to illuminate the area to be scanned. If the radiation passes first through two diffusers, the eye will never be exposed to a concentrated source. In this configuration the scanning would be accomplished by forming a moving small image of the detector area onto the plane of the markings.

In the case where a broad source of radiation that emits radiation over a range of frequencies, such as a halogen lamp or a tungsten lamp, is used to illuminate the area containing the markings, a suitable small-area interference filter can be used to isolate the wavelength band to be sensed. The filter can be either at the source, or at the detector, or both, or in between, as may be smallest and most convenient. A tiny image of the detector would be used to scan the markings.

It is possible to further improve the probability of detection of the presence of the deposited material by processing the signal with a "matched" electrical filter. (In the case where it is only necessary to determine whether or not a signal is present, an electrical filter that maximizes the ratio of output signal power to output noise power will be optimum in the mean square error sense. Knowing the signal properties and the noise properties, it is possible to derive such a filter. "Matched" filters are known in communication systems theory. See, for example, Cooper, McGillem, *Modern Communications and Spread Spectrum*, ISBN 0-07-012951-7, pp. 82–91). For a single pass scanning system modified to read absorption markings or strips at wavelength $\lambda o$, the IR absorption signal pulse will, typically, have a Gaussian shape with a pulse duration dictated by the velocity of the probe beam passing over the IR absorption marking, the spatial extent of the IR detecting probe on the IR absorption marking, and the size of the IR absorption marking along the scan direction. To achieve maximum S/N ratio (detection) for such a signal, a "matched" filter, preferably placed just after the output of the detector/preamplifier, should be employed. The "matched" filtering would probably be done in the digital domain by first A/D converting the detector/preamplifier output at a frequency sufficiently higher than the reciprocal of the duration of the IR absorption signal pulse, and a high speed DSP to do the "matched" filtering in real time. The shape, duration, and potential repetition rate of the IR absorption signal pulse will govern the design of the "matched" filter. To accommodate a range of distinctly different shaped IR absorption signals due to different size markings, different scan angles over the markings, different distances of the marking from the scanner, different IR absorption materials with different signatures, etc., a bank of two or more matched filters in parallel could be employed. The outputs from the filters would be compared to determine both the existence of an IR absorption marking and (depending on which filter had the strongest signal) the type or character of the IR absorption marking. The bank of "matched" filters could possibly be accomplished using just one DSP and microprocessor with cache memory in real time. Also, the relative position of the marking(s) can be determined by the one to one relationships between the time of detection and position in the scan. If repeat scans are permissible, then the S/N ratio of the "matched" filter scheme would improve by the square root of the number of repeat scans taken.

Figure 9B:
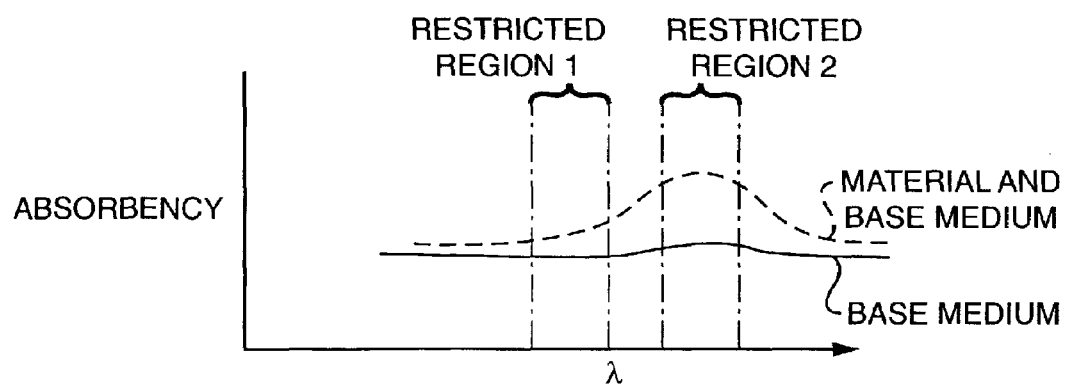

It is also possible to further improve the probability of detection of the presence of the deposited material by dividing the restricted range of detectable wavelengths in the reflected portion of the radiation into a plurality of regions. This could be accomplished by using a plurality of filters and detectors. In one embodiment, two regions are selected where one of the regions is at the peak of one relative absorption maximum and the other region is at the trough of the same relative absorption maximum (refer to FIG. 9B). This could be implemented using a pyroelectric detector where the opposing sensitive areas of the pyroelectric detector may be superimposed spatially but filtered for slightly different wavelength response by narrow-band interference filters. (Pyroelectric detectors usually have of a pair of sensitive response areas near each other, but giving opposite electrical polarity.) It could also be implemented using two separate detectors. The reflected radiation in each region of the wavelength range will produce two electrical signals. Each electrical signal is produced by one detector or one sensitive area of a single detector. One electrical signal is produced by collecting the radiation from the region at the peak of one relative absorption maximum and the other electrical signal is produced by collecting the radiation from the region at the trough of the same relative absorption maximum. The two electrical signals are subtracted to produce a difference signal which will have better signal-to-noise since the common mode noise will be eliminated. Again, a "matched" electrical filter can be used to further improve the probability of detection of the presence of the deposited material.

In another embodiment, three regions are selected where one of the regions is at the peak of one relative absorption maximum and the other regions are at either trough of the same relative absorption maximum. This embodiment could be implemented using three separate detectors. The reflected radiation in each region of the wavelength range will produce three electrical signals. Each detector produces one electrical signal. One electrical signal is produced by collecting the radiation from the region at the peak of one relative absorption maximum and the other two electrical signals are produced by collecting the radiation from the region at either trough of the same relative absorption maximum. The electrical signals from the region at either trough of the same relative absorption maximum are averaged and the resulting average signal is subtracted from the signal produced by collecting the radiation from the region at the peak of one relative absorption maximum. The difference signal will have better signal-to-noise since the common mode noise will be eliminated. Again, a "matched" electrical filter can be used to further improve the probability of detection of the presence of the deposited material.

As should be apparent to one skilled in the art, if the range is restricted at the source by utilizing at least one source that emits only in a range of wavelengths (for example, lasers that emit at the desired wavelengths) and the range is divided into a plurality of regions, the collecting means should include means of directing each sub-range (that is, region) to a separate detecting surface.

Another method for further improving the probability of detection of the presence of the deposited material comprises, besides scanning the radiation over the markings and base medium, restricting the range of detectable wavelengths and collecting the restricted portion of reflected radiation, the additional step of inducing an oscillation in the intensity of the collected radiation, said oscillation having characteristics that vary along the scan.

Figure 10:
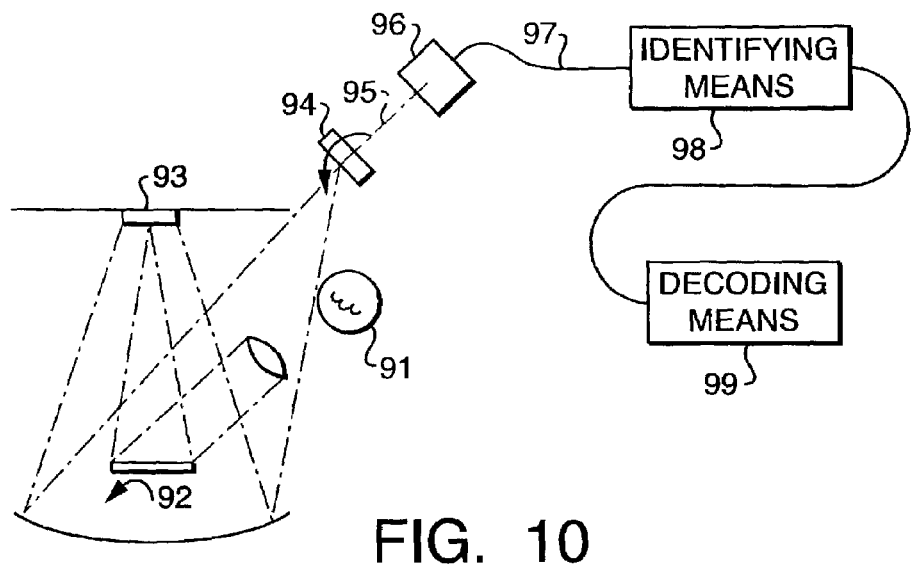
FIG. 10 is a graphical schematic representation of an apparatus used for retrieving the information encoded in a marking where the detection is aided by conditioning the signal by restricting the range of detectable wavelengths and also inducing an oscillation in the intensity of the collected radiation.

Referring to FIG. 10, a source of radiation 91 is scanned, using scanning means 92, over a marking 93, consisting of material deposited or intertextured onto a base medium. The source of radiation 91 could be a broad source of radiation that emits infrared radiation over a range of frequencies, such as a halogen lamp or a tungsten lamp.

While FIG. 10 depicts the reflected radiation case, it is obvious to those schooled in the art that the transmitted radiation could be used instead. In the transmitted case, the transmitted portion of the radiation is collected at the detector or detectors. After the entrance to the detector or detectors, the two cases proceed identically.

Figure 11:
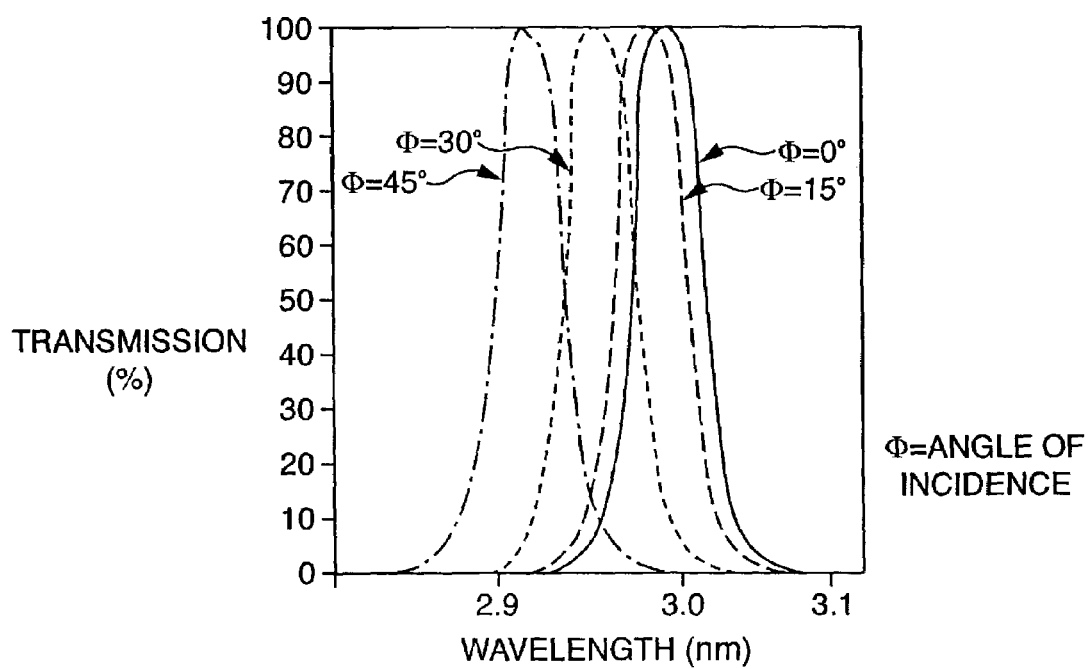
FIG. 11 depicts the manner in which the periodic tilting or oscillating of an optical filter causes its center wavelength to oscillate.

The reflected portion of the radiation is collected at the detector 96, where the detector could be any infrared detector, for example, any of the previously mentioned detectors. The range of detectable wavelengths in the reflected portion of the radiation that reaches the detector 96 is restricted to locations in the spectrum exhibiting at least one relative absorption maximum in the infrared by restricting means 94. One embodiment of the restricting means would be an optical filter. The filter can be either at the source, or at the detector, or both, or in between, as may be smallest and most convenient. Oscillation inducing means 95 induce an oscillation in the intensity of the restricted portion of the reflected radiation collected at a detector, said oscillation having characteristics that vary along the scan. One embodiment of the oscillation inducing means is means to pivot the filter about its center, oscillating it with a small amplitude. Such means could be similar to the scanning means previously described. This periodic tilting of the filter causes its center wavelength to oscillate as shown in FIG. 11.

Another embodiment of the oscillation inducing means utilizes a narrow-band multilayer interference filter with a peak wavelength that varies with position across the plate (the plane of the filter). The filter design involves one or more layers with a thickness changing uniformly with position. Spinning such a plate about an axis perpendicular to its surface and suitably placing it on the gradient of thickness of the variable thickness layers, the peak wavelength transmitted just to one side of that axis will vary sinusoidally with rotation between two limit values, the range dependent on the decentration. The plate could be supported with a suitable number of simple springs so that it could be made to oscillate in its plane by simple resonance, driven by a changing magnetic field or shaken by a small motor with an eccentric weight. Again the peak wavelength will vary sinusoidally, between limits defined by the gradient and the amplitude of resonant travel, in a manner as shown in FIG. 11.

Figure 12A:
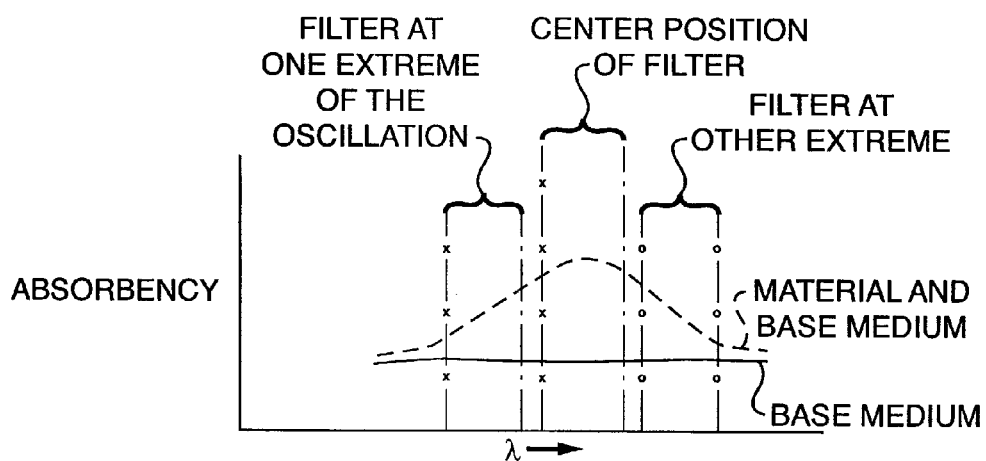
FIG. 12 depicts the manner in which an optical filter that is tilted periodically sweeps over the relative absorption maximum.
Figure 12B:
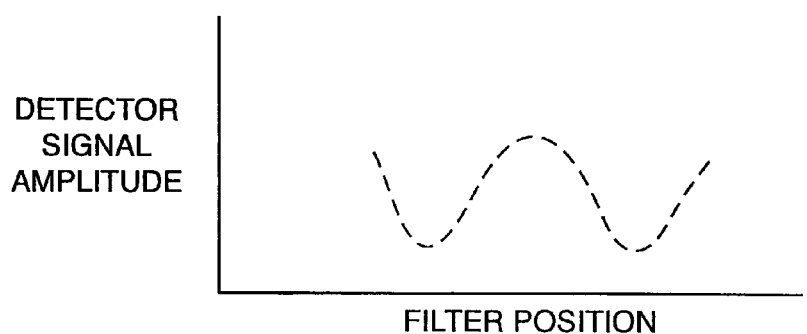

The filter then sweeps over the relative absorption maximum as shown in FIG. 12. This sweeping over the relative maximum, if properly arranged, moves the center wavelength from the peak of the relative absorption to either one of the troughs, thereby inducing an oscillation in intensity of the collected radiation. The electrical signal 97 produced by the detector 96 in response to the collected radiation will be modulated by the oscillation. The modulating signal has the effect of shifting the information content from low frequencies to the modulating frequency. The identifying means 98 would include a band limited electrical filter, which would select the electrical signal in the vicinity of the modulating frequency. By judicious choice of the modulating frequency, the identifying will occur in the presence of reduced detector noise (See, for example, FIGS. 4-8 in Dereniak, Crowe, *Optical Radiation Detectors*, ISBN 0-471-89797-3) which would result in improving the probability of detection of the presence of the deposited material. Again, a "matched" electrical filter can be used to further improve the probability of detection of the presence of the deposited material.

Other embodiments of the invention, including combinations, additions, variations and other modifications of the disclosed embodiments will be obvious to those skilled in the art and are within the scope of the following claims.

What is claimed is:

1. An apparatus for retrieving information, encoded as a function of surface dimension and thickness of at least one of a plurality of materials, said materials mildly absorbing radiation over a range of infrared wavelengths and substantially non-absorbing in visible wavelengths, at select wavelengths, comprising:

at least one of a plurality of sources of radiation wherein said at least one of a plurality of sources of radiation emits infrared radiation over a range of frequencies;

means for scanning the at least one of a plurality of sources of radiation over the medium and material disposed thereon, wherein a portion of said radiation is reflected or transmitted from the medium and material disposed thereon, said reflected or transmitted portion having a variable intensity over a scan, a variation of said intensity being a function of infrared radiation absorption or transmission characteristics of the medium and material and the thickness and surface dimensions of the material disposed on the medium;

means for collecting the reflected or transmitted portion of the radiation at each of a plurality of select wavelengths, from the range of wavelengths emitted by the at least one of a plurality of sources of radiation;

means for converting said collected radiation at each of the plurality of select wavelengths into a plurality of electrical signals;

means for determining, from the plurality of electrical signals, the reflectance or transmittance at the plurality of select wavelengths, for each of a plurality of spaced apart locations on the medium and material disposed thereon, placement of said locations being along the scan;

means for identifying, from the reflectance or transmittance at the plurality of select wavelengths at each of the plurality of spaced apart locations on the medium and material disposed thereon, the thickness and presence of the material at each of the plurality of spaced apart locations;

means for deducing the surface dimensions of the material from presence of the material at each of the plurality of spaced apart locations;

means for decoding the information encoded in the thickness and surface dimension of the material.

2. The apparatus of claim 1 wherein the means for identifying the thickness and presence of the material at each of the plurality of spaced apart locations comprises the use of Principal Component Analysis.

3. The apparatus of claim 1 wherein the means for identifying the thickness and presence of the material at each of the plurality of spaced apart locations comprises the use of Multiple Linear Regression.

4. An apparatus for retrieving information encoded as a function of surface dimension and thickness of at least one of a plurality of materials, said materials mildly absorbing radiation over a range of infrared wavelengths and substantially non-absorbing in visible wavelengths, deposited on a medium or intertextured with a base medium, comprising:

means for scanning at least one of a plurality of sources of radiation over the medium and material disposed thereon, wherein said sources emit infrared radiation over a range of frequencies and wherein a portion of said radiation is reflected or transmitted from the medium and material disposed thereon, said reflected or transmitted portion having a variable intensity over a scan, a variation of said intensity being a function of infrared radiation absorption or transmission characteristics of the medium and material and the thickness and surface dimensions of the material disposed on the medium;

means for collecting the reflected or transmitted portion of the radiation at each of a plurality of select wavelengths, from the range of wavelengths emitted by the at least one of a plurality of sources of radiation;

means for converting said collected radiation at each of the plurality of select wavelengths into a plurality of electrical signals;

means for determining, from the plurality of electrical signals, the reflectance or transmittance and characteristics of the reflectance or transmittance at the plurality of select wavelengths, for each of a plurality of spaced apart locations on the medium and material disposed thereon, placement of said locations being along the scan;

means for identifying, from the reflectance or transmittance and characteristics of the reflectance or transmittance at the plurality of select wavelengths at each of the plurality of spaced apart locations on the medium and material disposed thereon, the thickness and presence of the material at each of the plurality of spaced apart locations; means for deducing the surface dimensions of the material from presence of the material at each of the plurality of spaced apart locations;

means for decoding the information encoded in the thickness and surface dimension of the material.

5. The apparatus of claim 4 wherein the means for identifying the thickness and presence of the material at each of the plurality of spaced apart locations comprises the use of Principal Component Analysis.

6. The apparatus of claim 4 wherein the means for identifying the thickness and presence of the material at each of the plurality of spaced apart locations comprises the use of Multiple Linear Regression.

7. The apparatus of claim 4 wherein said characteristic of the reflectance or transmittance is a second derivative.

8. The apparatus of claim 7 wherein the means for identifying the thickness and presence of the material at each of the plurality of spaced apart locations comprises the use of Principal Component Analysis.

9. The apparatus of claim 7 wherein the means for identifying the thickness and presence of the material at each of the plurality of spaced apart locations comprises the use of Multiple Linear Regression.

10. The apparatus of claim 4 wherein said characteristic of the reflectance or transmittance is a first derivative.

11. The apparatus of claim 10 wherein the means for identifying the thickness and presence of the material at each of the plurality of spaced apart locations comprises the use of Principal Component Analysis.

12. The apparatus of claim 10 wherein the means for identifying the thickness and presence of the material at each of the plurality of spaced apart locations comprises the use of Multiple Linear Regression 13. The apparatus of claim 4 wherein said characteristic of the reflectance or transmittance is a third derivative.

14. The apparatus of claim 13 wherein the means for identifying the thickness and presence of the material at each of the plurality of spaced apart locations comprises the use of Principal Component Analysis.

15. The apparatus of claim 13 wherein the means for identifying the thickness and presence of the material at each of the plurality of spaced apart locations comprises the use of Multiple Linear Regression.

16. The apparatus as in claim 1, 2, 3, 4, 5, 6, 7, 8, 9, 10, 11, 12, 13, 14, or 15 wherein the means for identifying the thickness and presence of the material at each of the plurality of spaced apart locations include the use of neural networks.

17. The apparatus as in claim 1, 2, 3, 4, 5, 6, 7, 8, 9, 10, 11, 12, 13, 14, or 15 wherein the means for identifying the thickness and presence of the material at each of the plurality of spaced apart locations include the use of Mahalanobis distance techniques.

18. The apparatus of claim 1, 2, 3, 4, 5, 6, 7, 8, 9, 10, 11, 12, 13, 14, or 15 wherein the means for identifying the thickness and presence of the material at each of the plurality of spaced apart locations include the use of fuzzy neural networks.

19. The apparatus of claim 1, 2, 3, 4, 5, 6, 7, 8, 9, 10, 11, 12, 13, 14, or 15 wherein the means for identifying the thickness and presence of the material at each of the plurality of spaced apart locations include the use of clustering techniques.

20. The apparatus of claim 1, 2, 3, 4, 5, 6, 7, 8, 9, 10, 11, 12, 13, 14, or 15 wherein the means for identifying the thickness and presence of the material at each of the plurality of spaced apart locations include the use of fuzzy logic applied to clustering.

21. The apparatus of claim 1, 2, 3, 4, 5, 6, 7, 8, 9, 10, 11, 12, 13, 14, or 15 wherein the means for identifying the thickness and presence of the material at each of the plurality of spaced apart locations include the use of Euclidean distance analysis.

22. An apparatus for retrieving information encoded as a function of surface dimension and thickness of a material deposited on a medium, said material absorbing radiation over a range of infrared wavelengths, exhibiting at least one relative absorption maximum in infrared and being substantially non-absorbing in visible wavelengths, said apparatus comprising:
   means for scanning a source of radiation over the medium and material deposited thereon, said source emitting infrared radiation over a range of frequencies and the reflected or transmitted portion of said radiation having a variable intensity over a scan, a variation of said intensity being a function of infrared radiation absorption or transmission characteristics of the medium and material and the thickness and surface dimensions of the material disposed on the medium;
   means for restricting a range of detectable wavelengths in the radiation reflected or transmitted from the medium and material deposited thereon;
   means for collecting a restricted portion of the radiation reflected or transmitted from the medium and material deposited thereon;
   means for converting the collected radiation to an electrical signal;
   means for deducing from said electrical signal, the thickness and presence of the deposited material over the scan;
   means for decoding the information encoded in the thickness and surface dimension of the deposited material.

23. The apparatus of 22 wherein the means for deducing from said electrical signal, the thickness and presence of the deposited material over the scan further comprises:
   at least one of a plurality of matched filters for processing the signal.

24. The apparatus of claim 22 wherein the means for restricting the range of detectable wavelengths in the radiation reflected or transmitted from the medium and material deposited thereon further comprises:
   means for dividing the restricted range into a plurality of regions.

25. The apparatus of claim 24 wherein the number of regions is two.

26. The apparatus of claim 25 wherein one of the regions is centered at a peak of one relative absorption maximum and another region is centered at the trough of a same relative absorption maximum.

27. The apparatus of claim 26 wherein the number of electrical signals is two and one electrical signal is produced by collecting the radiation from the region at the peak of one relative absorption maximum and the other electrical signal is produced by collecting the radiation from the region at the trough of the same relative absorption maximum.

28. The apparatus of claim 27 wherein the step of deducing from said two electrical signals, the thickness and presence of the deposited material over the scan further comprises:
   means for subtracting the two electrical signals to produce a difference signal from which the thickness and presence of the deposited material over the scan will be deduced.

29. The apparatus of claim 24 wherein the number of regions is three and wherein one of the regions is centered at the peak of one relative absorption maximum and the other two regions are centered at each of the troughs of the same relative absorption maximum.

30. The apparatus of claim 29 wherein the number of electrical signals is three and one electrical signal is produced by collecting the radiation from the region at the peak of one relative absorption maximum and the other two electrical signals are produced by collecting the radiation from the region at each of the troughs of the same relative absorption maximum.

31. The apparatus of claim 30 wherein the means for deducing from said at least one of a plurality of electrical signals the thickness and presence of the deposited material over the scan further comprises:
   means for averaging the two electrical signals produced by collecting the radiation from the region at the troughs of the same relative absorption maximum; and
   means for subtracting the electrical signal produced by collecting the radiation from the region at the peak of one relative absorption from the signal resulting from averaging to produce a difference signal from which the thickness and presence of the deposited material over the scan will be deduced.

32. The apparatus of claim 28 or claim 31 wherein the means for deducing from said electrical signal, the thickness and presence of the deposited material over the scan further comprises:
   at least one of a plurality of matched filters for processing the signal.

33. The apparatus of claim 22 wherein the means for collecting the restricted portion of the radiation reflected or transmitted from the medium and material deposited thereon further comprises:
   means for collecting the restricted reflected or transmitted radiation utilizing two detecting surfaces wherein one said detecting surface receives the restricted reflected or transmitted radiation and the other said detecting surface receives radiation obtained by diffusing the restricted reflected or transmitted radiation.

34. The apparatus of claim 33 in which the means for deducing from said at least one of a plurality of electrical signals the thickness and presence of the deposited material over the scan further comprises:

means for obtaining a difference electrical signal by subtracting from the electrical signal corresponding to the detecting surface receiving the restricted reflected or transmitted radiation the electrical signal corresponding to the detecting surface receiving the diffused restricted reflected or transmitted radiation;

means for adding a fraction of the difference electrical signal to the electrical signal corresponding to the detecting surface receiving the restricted reflected or transmitted radiation to obtain an increased resolution electrical signal; and and wherein the means for deducing the thickness and presence of the deposited material over the scan utilizes said increased resolution electrical signal.

35. An apparatus of retrieving information encoded as a function of surface dimension and thickness of a material deposited on a medium or intertextured with a base medium, said material absorbing radiation over a range of infrared wavelengths, exhibiting at least one relative absorption maximum in infrared and being substantially non-absorbing in visible wavelengths, wherein a second material, said material absorbing radiation over a range of infrared wavelengths and substantially non-absorbing in visible wavelengths, has been deposited on the medium or intertextured with the base medium, comprising:

means for scanning a source of radiation over the medium and material deposited thereon, said source emitting infrared radiation over a wide range of frequencies and the reflected or transmitted portion of said radiation having a variable intensity over a scan, a variation of said intensity being a function of infrared radiation absorption or transmission characteristics of the medium and material and the thickness and surface dimensions of the material disposed on the medium;

means for restricting the range of detectable wavelengths in the radiation reflected or transmitted from the medium and material deposited thereon;

means for collecting a restricted portion of the radiation reflected or transmitted from the medium and material deposited thereon;

means for converting a collected radiation to an electrical signal;

means for identifying from said electrical signal, the thickness and presence of the deposited material over the scan, said identifying means comprising at least one of a plurality of matched filters for processing the signal, and wherein said second material provides a timing mark or marks, said timing mark or marks aiding to synchronize the gating of the "matched" filter "matched" filters;

means for deducing the surface dimensions of the material from presence of the material at each of the plurality of spaced apart locations; and means for decoding the information encoded in the thickness and surface dimension of the deposited material.

36. An apparatus for retrieving information encoded as a function of surface dimension and thickness of a material deposited on a medium, said material absorbing radiation over a range of infrared wavelengths, exhibiting at least one relative absorption maximum in infrared and being substantially non-absorbing in visible wavelengths, said apparatus comprising:

means for scanning a source of radiation over the medium and material deposited thereon, said source emitting infrared radiation over a range of frequencies and the reflected or transmitted portion of said radiation having a variable intensity over a scan, a variation of said intensity being a function of infrared radiation absorption or transmission characteristics of the medium and material and the thickness and surface dimensions of the material disposed on the medium;

means for restricting the range of detectable wavelengths in the radiation reflected or transmitted from the medium and material deposited thereon;

means for collecting a restricted portion of the radiation reflected or transmitted from the medium and material deposited thereon;

means for inducing an oscillation in an intensity of a collected radiation, said oscillation having characteristics that vary along the scan;

means for converting the collected radiation to an electrical signal;

means for deducing from said electrical signal, the thickness and presence of the deposited material over the scan; and means for decoding the information encoded in the thickness and surface dimension of the deposited material.

37. The apparatus of claim 22, 23, 24, 25, 26, 27, 28, 29, 30, 31, 33, 34, 35, or 36 wherein the range of detectable wavelengths in the radiation reflected or transmitted from the medium and material deposited thereon is restricted is utilizing at least one of a plurality of optical filters.

38. The apparatus of claim 22, 23, 24, 25, 26, 27, 28, 29, 30, 31, 33, 34, 35, or 36 wherein the range of detectable wavelengths in the radiation reflected or transmitted from the medium and material deposited thereon is restricted at the source by utilizing a source that emits only in a range of frequencies.

39. The apparatus of claim 36 wherein the oscillation in the intensity of the collected radiation is induced by pivoting an optical filter about its center.

40. The apparatus of claim 36 wherein the means for deducing from said electrical signal, the thickness and presence of the deposited material over the scan further comprises:

at least one of a plurality of matched filters for processing the signal.

* * * * *